United States Patent [19]

Kamoshita et al.

[11] Patent Number: 4,777,631
[45] Date of Patent: Oct. 11, 1988

[54] LOADING SYSTEM FOR A DISC CARTRIDGE CASE HOUSING A DISC IN A DISC PLAYBACK DEVICE

[75] Inventors: Yasuhiko Kamoshita; Kazuo Urata; Mikio Ogusu, all of Hamamatsu, Japan

[73] Assignee: Nippon Gakki Seizo Kabushiki Kaisha, Hamamatsu, Japan

[21] Appl. No.: 870,101

[22] Filed: Jun. 3, 1986

[30] Foreign Application Priority Data

| Jun. 14, 1985 | [JP] | Japan | 60-89712[U] |
| Jun. 20, 1985 | [JP] | Japan | 60-93346[U] |
| Jun. 20, 1985 | [JP] | Japan | 60-93347[U] |
| Jul. 3, 1985 | [JP] | Japan | 60-101315[U] |
| Jul. 3, 1985 | [JP] | Japan | 60-101316[U] |

[51] Int. Cl.$^4$ .................................. G11B 23/02
[52] U.S. Cl. ............................. 369/77.2; 360/133
[58] Field of Search .............. 369/75.1, 75.2, 77.1, 369/77.2; 360/133, 99

[56] References Cited

U.S. PATENT DOCUMENTS

| 4,509,086 | 4/1985 | Hickethier et al. | 360/99 |
| 4,587,585 | 5/1986 | Shimaoka et al. | 360/133 |
| 4,617,655 | 10/1986 | Aldenhoven | 369/77.2 |
| 4,627,037 | 12/1986 | Tamaru | 369/75.2 |

Primary Examiner—Steven L. Stephan
Attorney, Agent, or Firm—Spensley Horn Jubas & Lubitz

[57] ABSTRACT

In a disc playback device in which a disc cartridge case housing a disc is loaded in a disc cartridge case holder of a main body of the device and this holder is moved from a disc non-playback position to a disc playback position for playing back of the disc, a loading system for a disc cartridge case comprises a curved surface portion formed in a corner portion on the side of the disc cartridge case from which the case is inserted into the holder and an uncurved surface portion formed in a corner portion on the side opposite to the side from which the case is inserted into the holder. A case erroneous insertion blocking member having an engaging portion is provided on the holder. If the case in its correct insertion posture is inserted into the holder, the engaging portion of the blocking member cooperates with the curved surface portion of the case to permit the case to be inserted into the holder. If the case in an incorrect insertion posture is about to be inserted into the holder, the engaging portion of the blocking member cooperates with the uncurved portion of the case to prevent the case from being inserted into the inside of the holder.

14 Claims, 10 Drawing Sheets

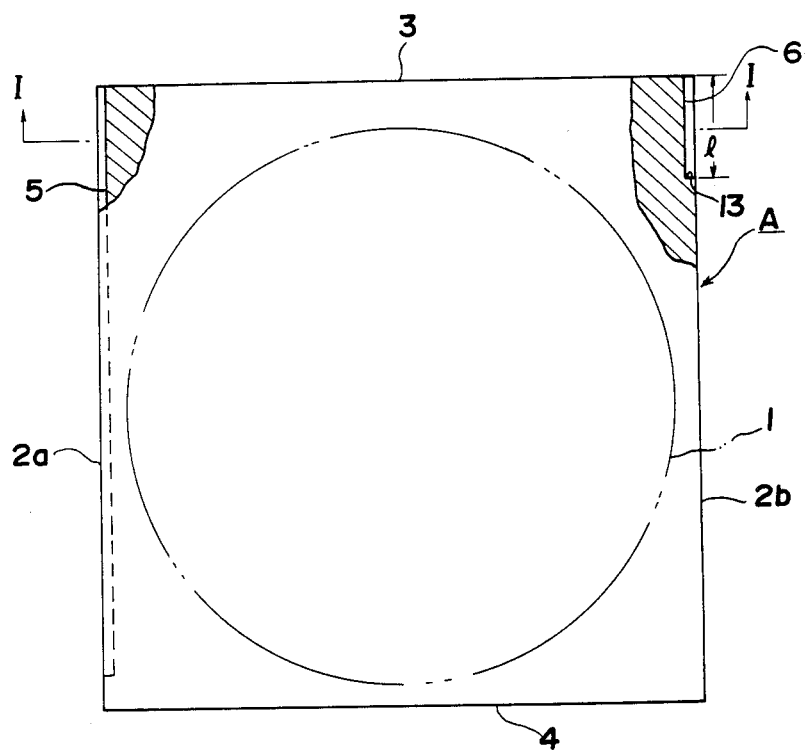
PRIOR ART FIG. 1
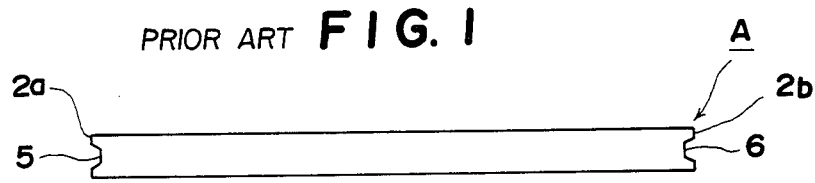
PRIOR ART FIG. 2

LOADING SYSTEM FOR A DISC CARTRIDGE CASE HOUSING A DISC IN A DISC PLAYBACK DEVICE

FIELD OF THE INVENTION

This invention relates to a loading system for a disc cartridge case which, in a disc playback device of a type in which a disc housed in a disc cartridge case is loaded in a main body of the device and is played back therein, can prevent accidental insertion of the disc cartridge case in an incorrect insertion posture and also enables the case to be positioned in a correct position in the main body thereby realizing an accurate and precise loading of the case in the main body.

BACKGROUND OF THE INVENTION

As a system for loading a disc cartridge case in a disc playback device, one as shown in FIGS. 1–4 has been proposed. The disc playback device shown in these figures is of a type which comprises a disc cartridge case A and a main body B and in which a disc 1 housed in the case A is loaded with the case A in the main body B for playback thereof.

The case A is of a rectangular shape in its plan view as shown in FIGS. 1 and 2 and consists of a hollow plate-like member having a certain thickness and being capable of housing the disc 1 therein in a state in which the disc 1 can be played back. The case A is formed in its one side portion 2a with a groove 5 which extends from an end surface 3 from which the case A is inserted into the main body B to a point in the vicinity of an end surface 4 from which the case A is not normally inserted. The case A is formed also in its other side portion 2b with a groove 6 extending over a length l from the end surface 3. The insertion end surface 3 and the non-insertion end surface 4 are flat surfaces crossing at right angles with the side surfaces 2a and 2b.

The main body B plays back the disc 1 with the case A housing the disc 1 being loaded in a predetermined position therein. As shown in FIGS. 3 and 4, a turntable 8 rotated by a disc drive motor (not shown) is provided above a chassis 7 of the main body B. Above the turntable 8 is provided a vertically movable disc cartridge case holder 9. Gide walls 10 and 11 are formed on the upper surface of the holder 9 for guiding the case A. A stop 12 is formed on the inner surface of the guide wall 10 for preventing an erroneous insertion of the case A.

For loading the case A in the main body B in the above described disc playback device, the case A is inserted from the insertion end surface 3 into the holder 9 in its uplifted position in the direction of arrow P1, with the upper surface of the case A facing upwardly. When the center of the case A has reached a point above the turntable 8, the holder 9 is lowered and thereby permits the turnable 8 to relatively enter the inside of the case A through a turntable insertion opening (not shown). Thus, when the holder 9 has reached its lowermost position, the disc 1 is placed on the turntable 8.

In the case where the case A is inserted in the holder 9 in a correct insertion posture as described above, the stop 12 is located in the groove 5 as shown in FIG. 4 thereby permitting the case A to be inserted in the direction of arrow P1.

In this disc playback device, if it is attempted to insert the case A into the holder 9 in a posture which is not normal, the stop 12 abuts against a portion of the case A other than the groove 5 and thereby prevents the case A from being inserted to the predetermined position. If, for example, it is attempted to insert the case A from the insertion end surface 3 into the holder 9 with its lower surface facing upwardly, the stop 12 abuts against a wall portion 13 which closes the end portion of the groove 6 when the stop 12 has moved in a relative movement in the groove 6 by the distance l so that the case A cannot move further in the direction of arrow P1. If, again, it is attempted to insert the case A from the non-insertion end surface 4 into the holder 9 with its upper surface or lower surface facing upwardly, the left or right side end portion of the non-insertion end surface 4 abuts against the stop 12 and in this case also the case A cannot move further in the direction of arrow P1. In this manner, the proposed device can prevent erroneous insertion of the case A into the holder 9.

In the device for preventing erroneous insertion of the disc cartridge case, the stop 12 can be provided at only one location on one guide wall 10. This arrangement has the disadvantage that, if the case A is forced into the holder 9 in an incorrect insertion posture, there is likelihood that the stop 12 is not strong enough to block the advancing case A so that the case A pushes the stop 12 aside and moves in the direction of arrow P1 causing damage to the case A or the main body B.

The structure of the proposed device in which the grooves 5 and 6 are formed in the side portions of the case A complicates the design of the case A and, moreover, necessitates wall portions for forming the grooves 5 and 6 in the case A with resulting difficulty in making the case A in a compact design.

SUMMARY OF THE INVENTION

It is, therefore, an object of the invention to provide a loading system for loading a disc cartridge case in a main body of a disc playback device having a sufficient strength to resist against a force applied when the case is inserted into the main body in an erroneous manner and being capable of accurately loading the case and making the case in a more compact design.

It is another object of the invention to provide a loading system for a disc cartridge case capable of accurately loading a disc cartridge case in a predetermined position in a main body of a disc playback device.

In a disc playback device comprising a main body including a chassis, a turntable provided above the chassis and a disc cartridge case holder supported on the chassis in such a manner that it is displaceable with respect to the turntable between a disc playback position and a disc non-playback position, said disc cartridge case housing a disc being loaded in said disc cartridge case holder which is displaced from the disc non-playback position to the disc playback position for playing back of the disc, a loading system for a disc cartridge case achieving the above described first object of the invention comprises a curved surface portion formed in a corner portion on the side of the disc cartridge case from which the disc cartridge case is inserted into the disc cartridge case holder, an uncurved surface portion formed in a corner portion on the side of the disc cartridge case opposite to the side from which the disc cartridge case is inserted into the disc cartridge case holder, and a case erroneous insertion blocking member being rotatable between a case inserting position in which the disc cartridge case can be inserted into the disc cartridge case holder and a case blocking position in which the disc cartridge case cannot be inserted into the disc cartridge case holder and including an engaging portion being engageable with the curved surface portion and uncurved surface portion of the disc cartridge case in such a manner that, when the disc cartridge case is in a correct insertion position, the engaging portion cooperates with the curved surface portion to rotate the case erroneous insertion blocking member from the case blocking position to the case inserting position whereas, when the disc cartridge case is in an incorrect insertion posture, the engaging portion cooperates with the uncurved surface portion to retain the case erroneous insertion blocking member in the case blocking position.

A loading system for a disc cartridge case achieving the second object of the invention is of the above described construction and additionally comprises a rack provided on the disc cartridge case, a loading pinion provided on the main body for meshing with the rack to drive the disc cartridge case to a predetermined position in the disc cartridge case holder, a recess or a groove formed in the disc cartridge case, and a synchronizing projection provided on the loading pinion being engageable in said recess or groove in the disc cartridge case before the loading pinion meshes with the rack so as to synchronize initial meshing between the loading pinion and the rack.

Other features of the invention will become apparent from the description made hereinbelow with reference to the accompanying drawings.

BRIEF DESCRIPTION OF THE DRAWINGS

In the accompanying drawings,

FIGS. 1 through 4 show the prior art loading system for a disc cartridge case in which, FIG. 1 is a plan view of a disc cartridge case showing a part thereof in a cross section;

FIG. 2 is a side view of the disc cartridge case taken along lines I—I in FIG. 1;

FIG. 3 is a plan view of a main body of the prior art device; and

FIG. 4 is a sectional view of the main body taken along lines II—II in FIG. 3,

FIGS. 5 through 17 show an embodiment of the loading system according to the invention in which, FIG. 5 is a perspective view showing a disc cartridge case with its upper side facing upwardly;

FIG. 6 is a perspective view showing the disc cartridge case with its lower side facing upwardly;

FIG. 7 is a perspective view showing the disc cartridge case with its cover being opened;

FIG. 8 is a perspective view showing the disc cartridge case in an exploded state;

FIG. 9 is a plan view of a main body of a disc playback device to which the invention is applied;

FIG. 10 is a side view taken along lines III—III in FIG. 9;

FIG. 11 is a perspective view of an essential portion of the loading system according to the invention;

FIG. 12 is a sectional view taken along lines IV—IV in FIG. 11;

FIG. 13 is a side view of a portion taken along lines V—V in FIG. 9 showing a state in which the disc cartridge case is engaged with a loading pinion provided in the main body;

FIG. 14 is a plan view taken along lines VI—VI in FIG. 13; and

FIGS. 15 through 17 are views for explaining the function of the loading system according to the invention.

DESCRIPTION OF PREFERRED EMBODIMENT

Figure 3:
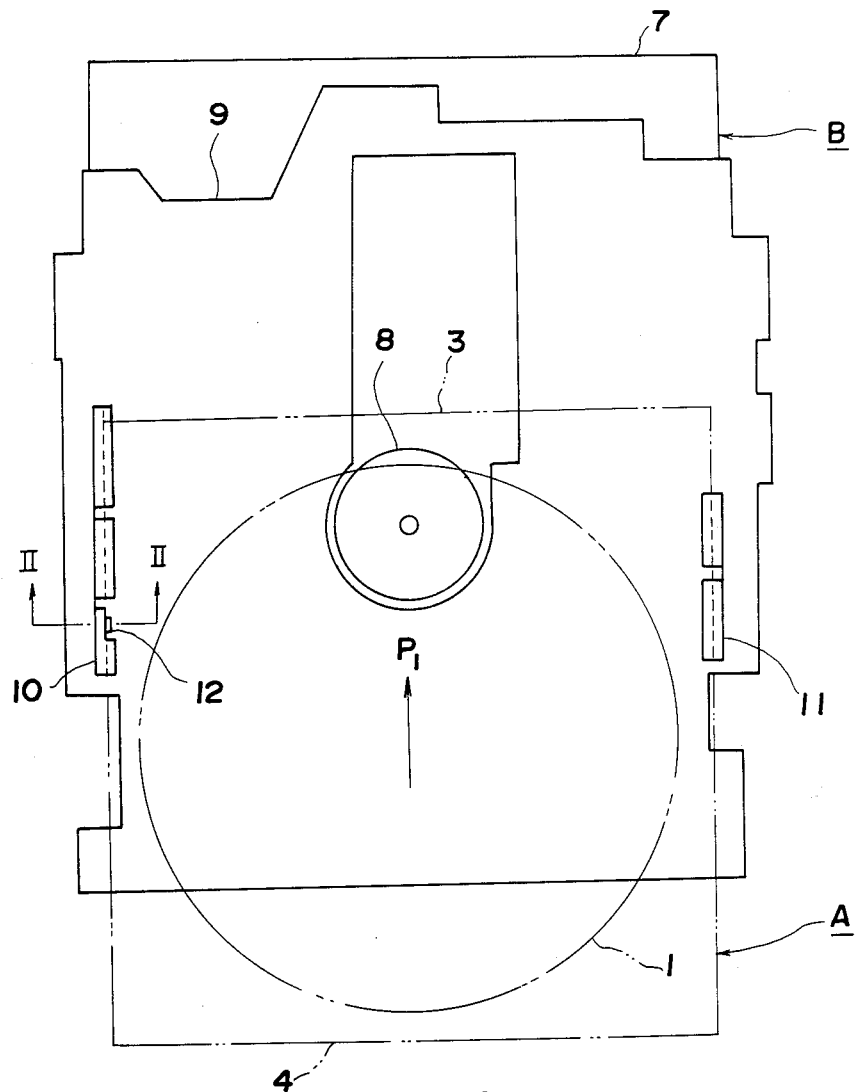
Figure 4:
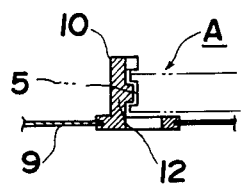
Figure 5:
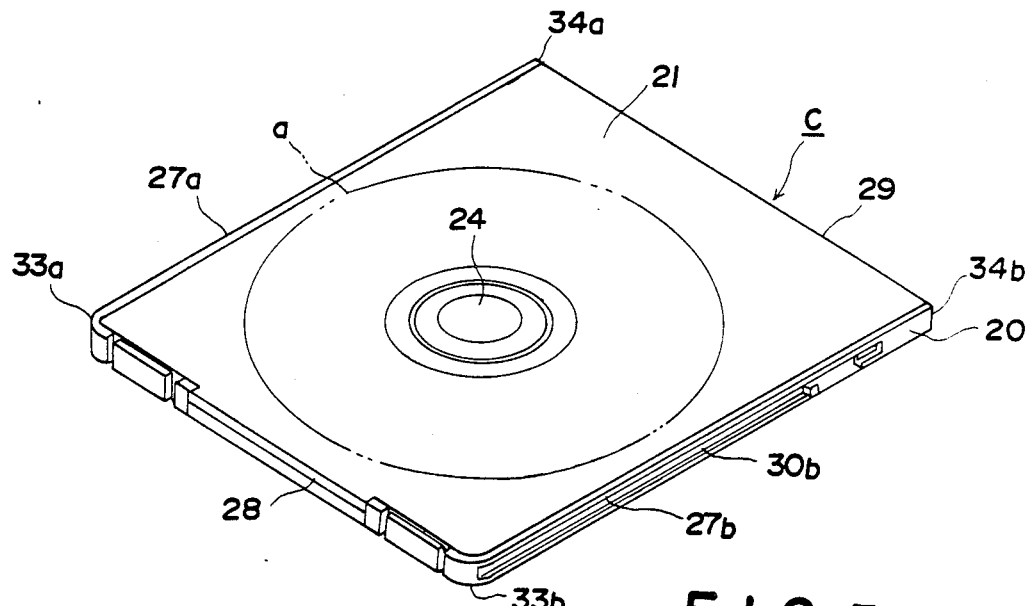

A disc playback device to which the present invention is applied comprises a disc cartridge case C shown in FIGS. 5 through 8 and a main body D shown in FIGS. 9 through 14. The disc playback device is of a type in which a disc is housed in the case C and this case C is loaded in the main body D in a state in which the disc is housed in the case C for playing back of the disc.

Referring first to FIGS. 5 through 8, the disc cartridge case C will be described. The case C is generally of a plate-like member having a rectangular shape in a plan view and having a certain thickness. This case C includes a frame 20 having a disc placing portion 19, a case lid 21 attached to the frame 20 so as to cover the upper surface of the disc placing portion 19, a bottom plate 22 fixedly secured to the frame 20 so as to cover the lower surface of the disc placing portion 19 and a shutter plate 23 disposed between the frame 20 and the bottom plate 22. A disc a is placed in the disc placing portion 19 in a state in which the disc a can be played back. The case lid 21 has its pins 25, 25 loosely fitted in recesses 20a, 20a formed in the frame 20 and is pivotable about the pins 25, 25 in the directions of arrows P5 and P6 thereby opening and closing the disc placing portion 19 and enabling replacement of a disc a in the disc placing portion 19. A disc stabilizer 24 is mounted in the central portion of the case lid 21. This disc stabilizer 24 functions to hold the disc a in association with a turntable provided in the main body D when the case C housing the disc a has been loaded in the main body D. The bottom plate 22 is formed with a turntable insertion opening 25 and a pickup head insertion slot 26. A shutter lever 23a is fixedly secured on the shutter plate 23 in such a manner that it projects outside of one side portion of the frame 20. By operating the shutter lever 23a, the shutter plate 23 is rotated in the directions of arrows P10 and P11 to open and close the pickup head insertion slot 26.

Figure 6:
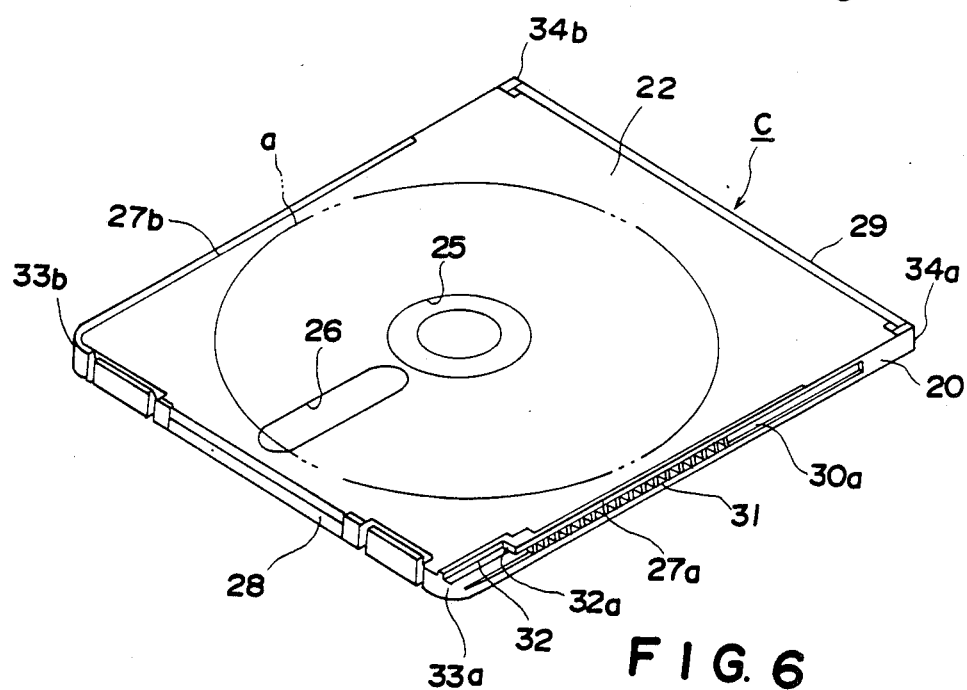
Figure 7:
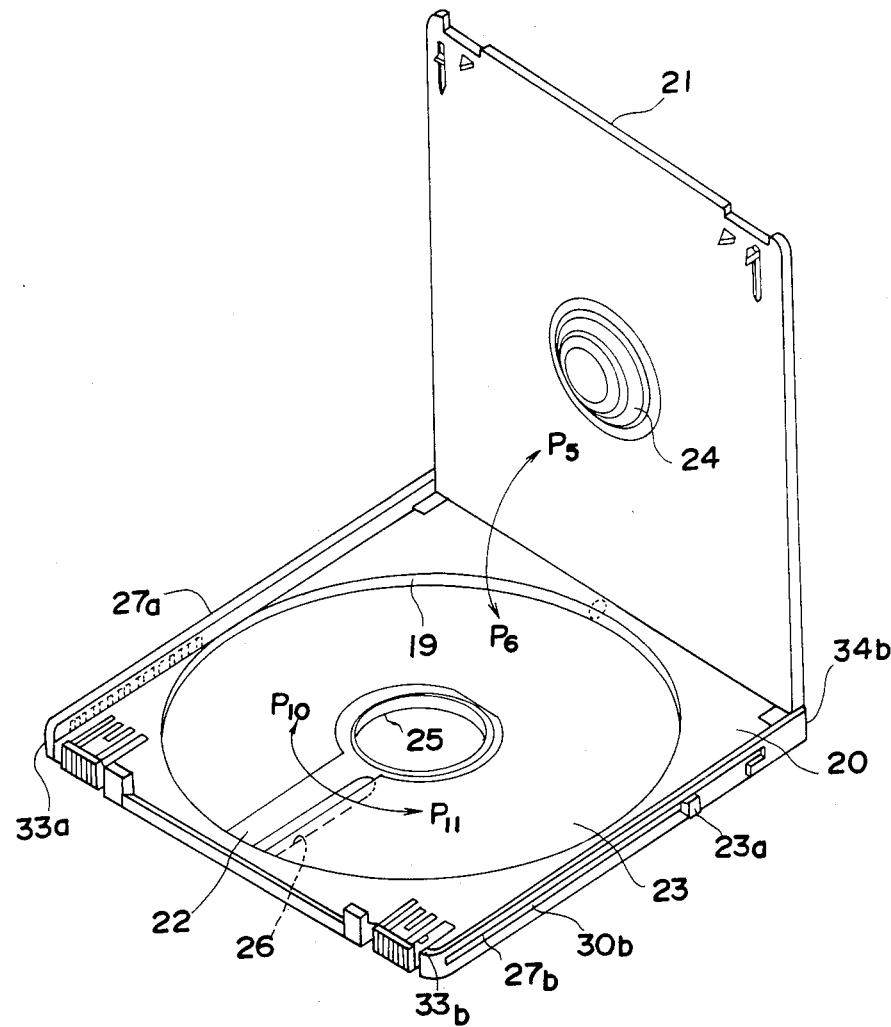
Figure 8:
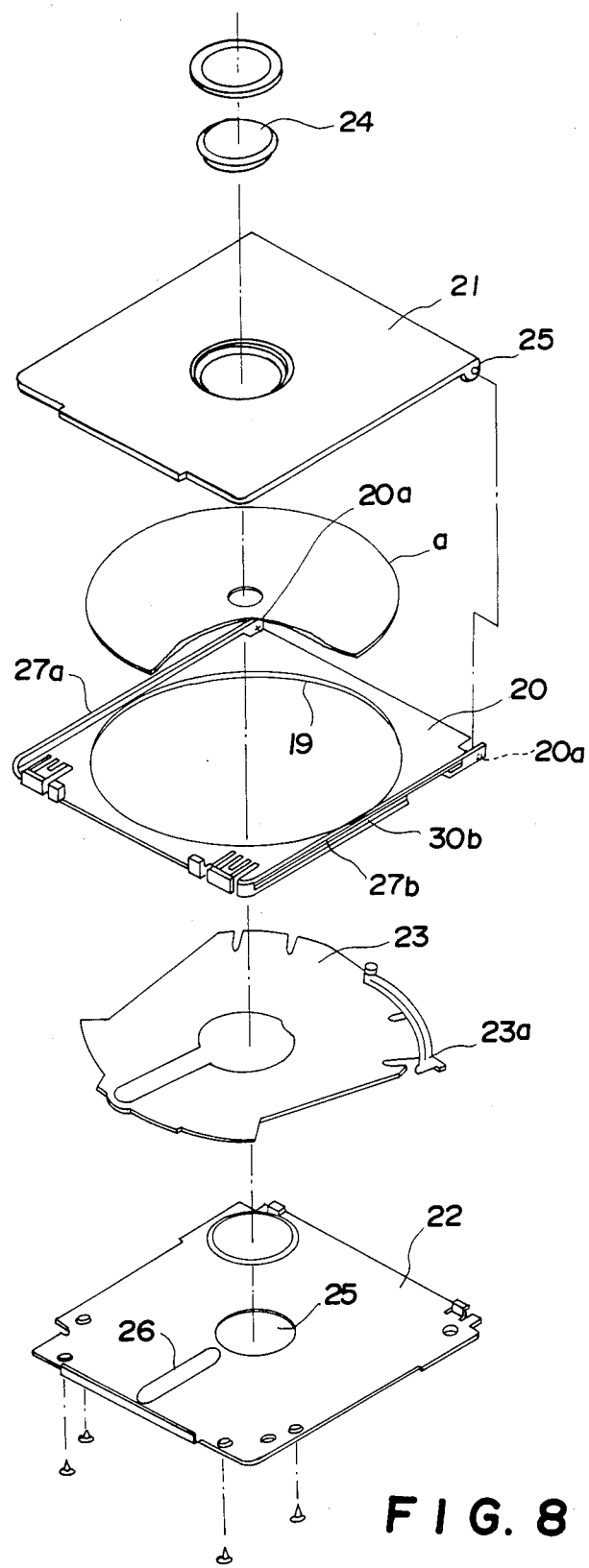

The frame 20 is formed in its side surfaces 27a, 27b (i.e., in the side portions of the case C) with guide grooves 30a, 30b extending from a front end surface 28 to a point in the vicinity of a rear end surface 29. A loading rack 31 is formed on the bottom surface of the guide groove 30a. The frame 20 is formed in its lower front end portion on the side on which the loading rack 31 is provided with a synchronizing recess 32 as shown in FIG. 6. This recess 32 is formed by removing a part of the lower front end portion of the frame 20 along the side surface 27a and its stepped portion 32a is located slightly forwardly of the starting end (i.e., a position of the first tooth) of the loading rack 31. This synchronizing recess 32 is provided for synchronizing meshing engagement between the rack 31 and a pinion provided in the main body D when the case C has been inserted in the main body D as will be described more in detail later.

The case C has curved surface portions in corner portions in one end thereof and uncurved surface portions in corner portions in the other end thereof and, by virtue of this peculiar configuration, is capable of being loaded in the main body D only when it is inserted in a correct insertion posture and otherwise is rejected. More specifically, two corner portions defined by crossing of the front end surface 28 and the side surfaces 27a, 27b are formed in curved surface portions 33a, 33b which gradually approach each other from the side surfaces 27a, 27b towards the front end surface 28. On the other hand, two corner portions defined by crossing of the rear end surface 29 and the side surfaces 27a, 27b are formed in uncurved surface portions 34a, 34b formed by crossing of the rear end surface 29 and the side surfaces 27a, 27b at right angles which respectively assume an L shape as viewed in plan. The synchronizing recess 32 also constitutes an uncurved surface portion.

Figure 9:
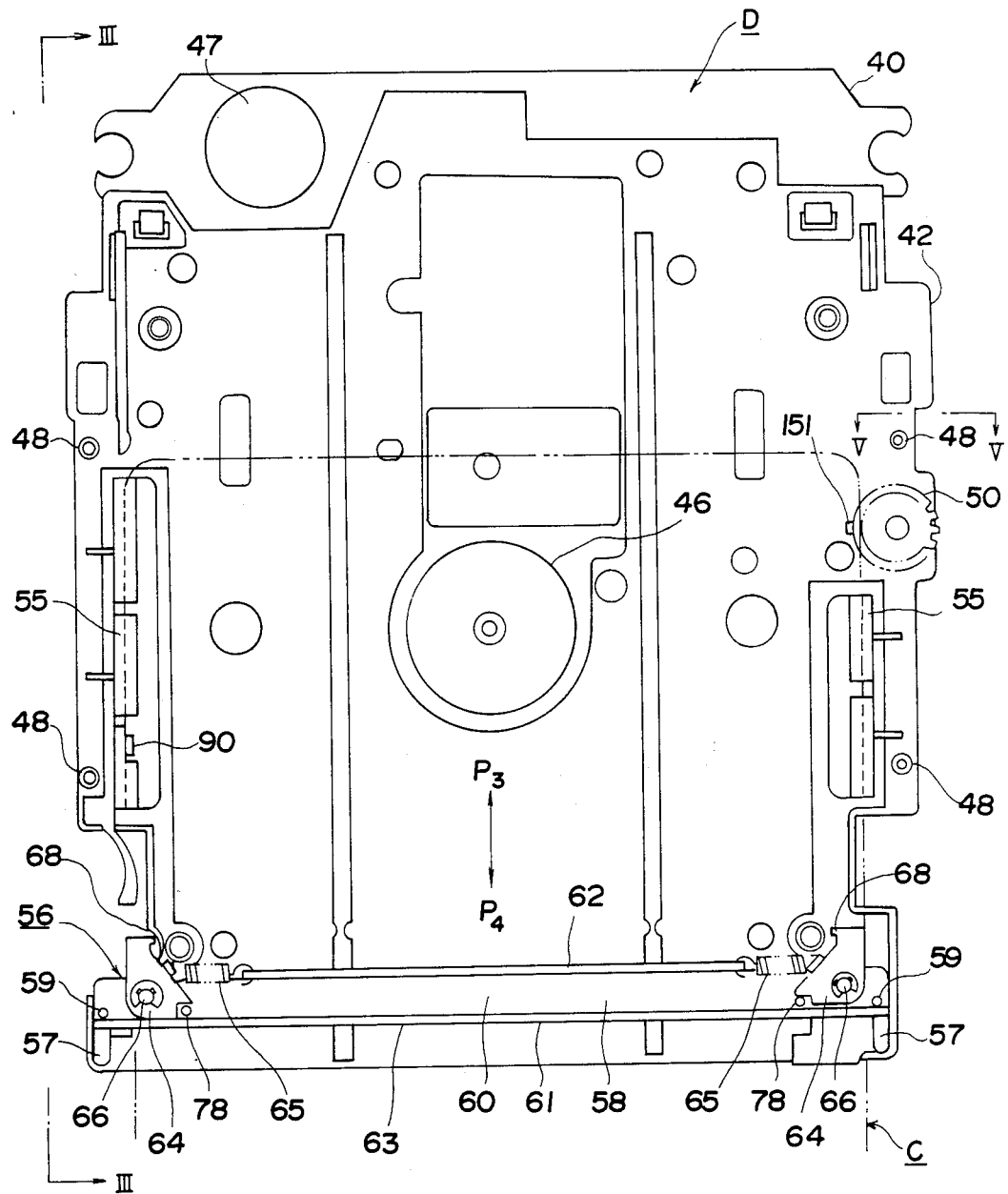
Figure 10:
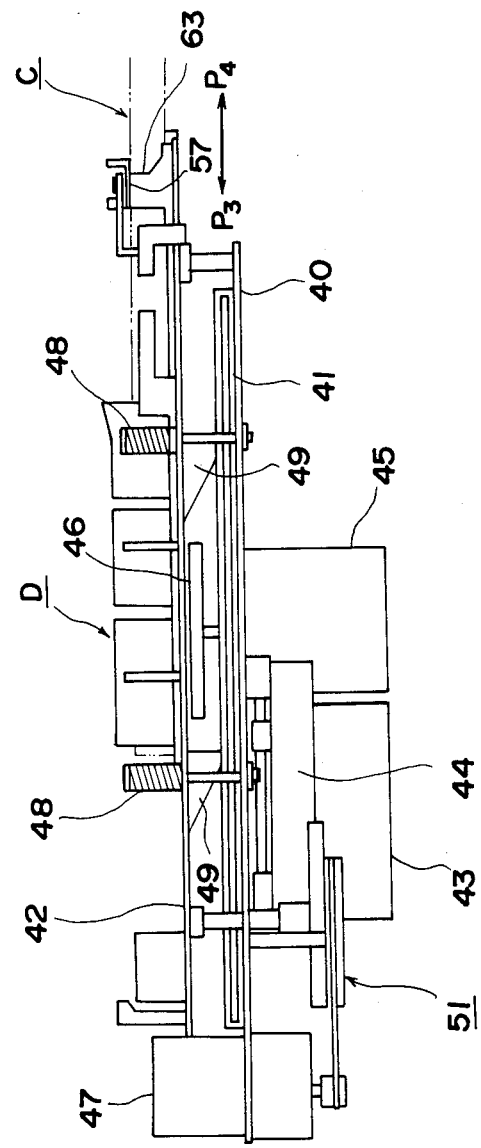

Referring now to FIGS. 9 through 14, the main body D will be described. In FIGS. 9 and 10, reference numeral 40 denotes a chassis. A carrier 41 and a disc cartridge case holder 42 are provided above the chassis 40 and a head base 44 carrying a pickup head 43 is provided beneath the chassis 40.

A disc drive motor 45 is secured on the lower surface of the chassis 40 and a turntable 46 is connected to a rotation shaft of the motor 45. A feed loading motor 47 is also secured to the chassis 40. The carrier 41 is disposed on the upper surface of the chassis 40 displaceably in the directions of arrows P3 and P4. The holder 42 is supported vertically movably on the upper surface of the chassis 40 above the carrier 41. The holder 42 is constantly urged downwardly by springs 48, 48, . . . When cams 49, 49, . . . formed on the lower surface of the holder 42 are in abutting engagement with the upper surface of the carrier 41, the holder 42 is in its uppermost position and as the cams 49, 49, . . . enter holes (not shown) formed in both the carrier 41 and the chassis 40, the holder 42 moves downwardly. On this holder 42 is mounted a loading pinion 50 which meshes with the loading rack 31 of the case C.

Figure 13:
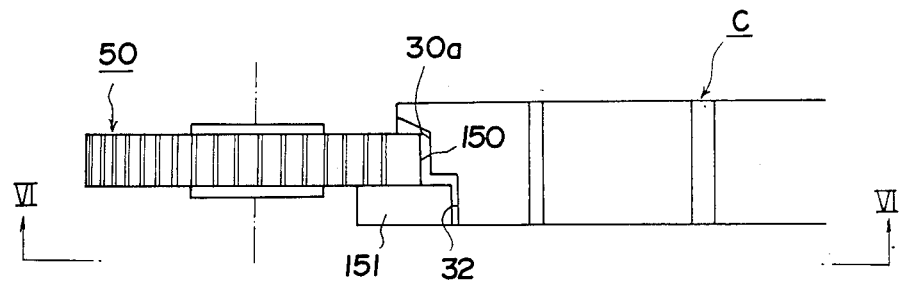
Figure 14:
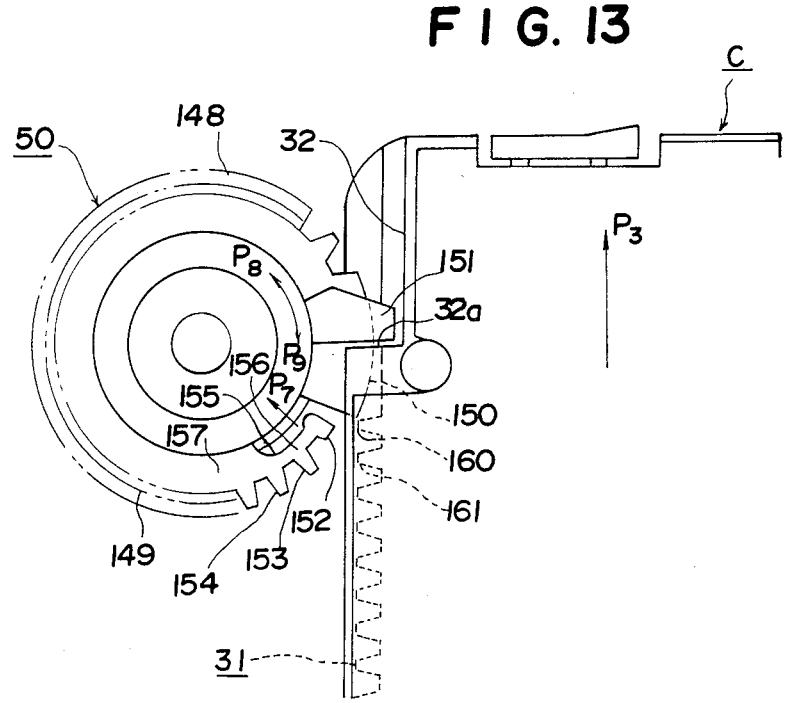

The loading pinion 50 is illustrated in detail in FIGS. 13 and 14. As shown in these figures, the pinion 50 includes a toothed portion 148 formed with teeth along a pitch circle 149 and a wall portion 150 formed intermediately in the toothed portion 148 and having no tooth. A synchronizing projection 151 projecting radially outwardly of the pinion 50 is provided on the lower surface of the wall portion 150. A recess 155 is formed between the wall portion 150 and a part of the toothed portion 148 in which teeth 152, 153 and 154 are formed in such a manner that the recess 155 separates the wall portion 150 and the tooth 152 and extends circumferentially of the pinion 50 along the base portions of the teeth 152-154. In this construction, a wall portion 156 formed with the teeth 152-154 functions as a cantilever supported on a base portion 157 of the pinion 50, being capable of flexing in the direction of arrow P7. The tooth 152 is lower in height than the other teeth including the teeth 153 and 154 and is formed in such a manner that its tooth edge substantially reaches the pitch circle 149 of the other teeth. The synchronizing projection 151 is provided for synchronizing initial meshing engagement between the teeth of the pinion 50 and those of the rack 31 in association with the synchronizing recess 32 formed in the case C when the case C is inserted into the main body D, as will be described more fully later.

In the above described device, the feed loading motor 47 is provided for driving the head base 44 in the direction of arrows P3 and P4 though a driving force transmission means 51. When the head base 44 has moved in these directions, the carrier 41 moves in the same directions with the head base 44 thereby moving the holder 42 in the vertical direction and rotating the loading pinion 50 through an unillustrated driving force transmission means. During playing back of the disc a, the holder 42 holds the case C housing the disc a and thereby places the disc a on the turntable 46. The loading pinion 50 meshes with the rack 31 of the case C during loading and ejection of the case C and thereby moves the case C in the directions of arrows P3 and P4.

On the holder 42 are provided guide walls 55, 55 on both side portions thereof for guiding the case C in the directions of arrows P3 and P4 during the movement of the case C. On the holder 42 is also provided erroneous insertion prevention means 56 for preventing an erroneous insertion of the case C in cooperation with the case C.

Figure 11:
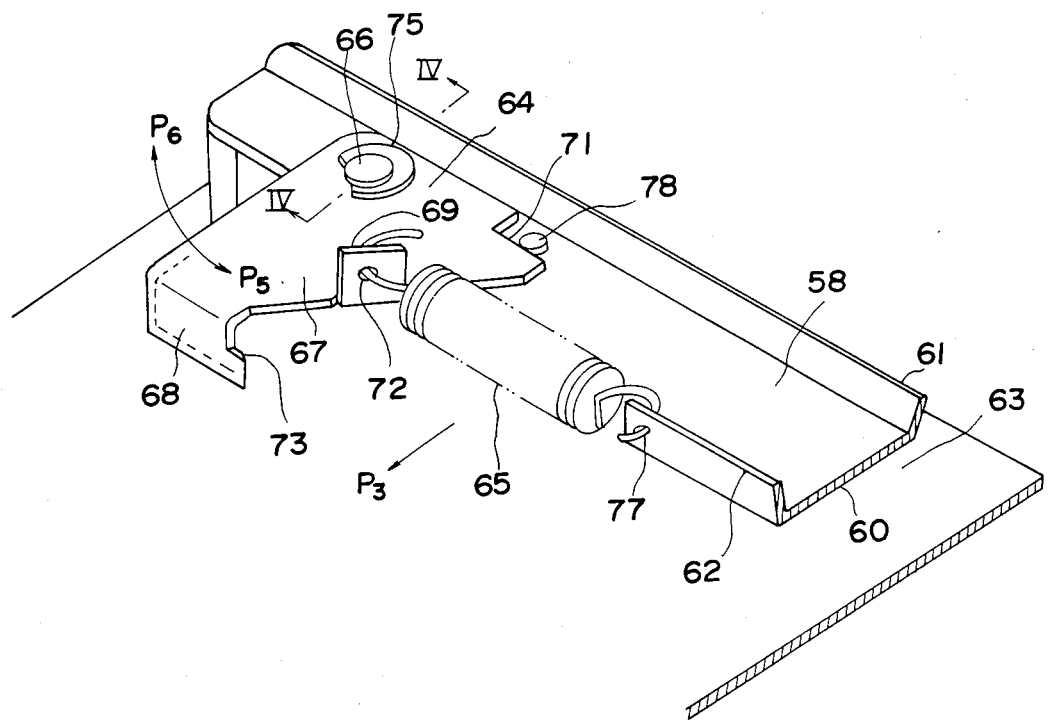

More specifically, upwardly projecting supports 57, 57 are secured on both sides of the upper surface of the front end portion of the holder 42. A frame 58 is secured on the upper surface of the supports 57, 57 by means of screws 59, 59. The frame 58 is generally of a plate-like configuration and, as shown in FIGS. 9 and 11, its main portion 60 extending in the direction crossing the direction P3 is formed with a guide wall portion 61 projecting upwardly and obliquely from the front end portion of the main portion 60 and also with a reinforcing wall portion 62 projecting upwardly from the rear end portion of the main portion 60. A space defined by this frame 58 and the front end portion of the holder 42 constitutes a disc cartridge case insertion opening 63. On both sides of the upper surface of the frame 58 are mounted case erroneous insertion blocking members 64, 64 and springs 65, 65 for biasing these blocking members 64, 64.

Figure 12:
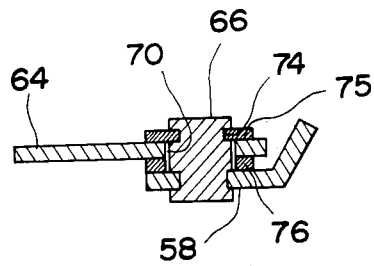

FIGS. 11 and 12 show configurations and a manner of mounting of the case erroneous insertion blocking member 64 and the spring 65 on one side only. As shown in these figures, an upwardly projecting pivot 66 is fixedly secured on the end portion of the frame 58 and the case erroneous insertion blocking member 64 is mounted on this pivot 66 rotatably in the directions of arrows P5 and P6. The case erroneous insertion blocking member 64 is formed by cutting and folding a plate into a predetermined shape. The blocking member 64 has a main portion 67 of a generally triangular shape as viewed in plan, an engaging portion 68 extending downwardly from the rear end of the main portion 67 and a spring engaging wall 69 projecting upwardly from one side edge of the main portion 67. The main portion 67 is formed with an opening 70 for mounting the blocking member 64 on the pivot 66 and a recess 71 and the spring engaging wall 69 is formed with a hole 72. The engaging portion 68 has an edge portion 73 having a curved surface on the inner side thereof. The blocking member 64 is mounted on the frame 58 with the engaging portion 68 being positioned rearwardly of the frame 58 and the pivot 66 being inserted in the opening 70. The blocking member 64 is prevented from slipping upwardly by means of a retainer 75 fitted in an annular groove 74 formed in the pivot 66. A washer 76 is interposed between the blocking member 64 and the frame 58. The spring 65 is secured in one end thereof to the hole 72 of the spring engaging wall 69 and in the other end thereof to a hole 77 formed in the reinforcing wall portion 62. This arrangement causes the blocking member 64 to be urged by the spring 65 in the direction of arrow P5. The blocking member 64 however is stopped at a predetermined position, namely a position in which the front end surface of the engaging portion 68 crosses at right angles with the direction in which the case C is inserted (i.e., the direction of arrow P3), by abutting of the recess 71 with a projection 78 provided on the upper surface of the frame 58.

The blocking member 64 provided on the other side of the frame 58 is of a configuration symmetrical with the above described blocking member 64 and is symmetrically mounted on the frame 58 with the other spring 65.

For playing back the disc a by the disc playback device of the above described construction, the disc a is housed in the disc cartridge case C and this case C is manually inserted from the insertion opening 63 of the main body D into the holder 42 in its uppermost position. At this time, the case C assumes a posture in which the case lid 21 is facing upwardly and the front end surface 28 is constituting the end surface from which the case C is inserted into the holder 42. In inserting the case C, this correct insertion posture of the case C can be readily recognized with the eye because the curved surface portions 33a, 33b on the insertion side of the case C have a different shape from the uncurved surface portions 34a, 34b on the noninsertion side thereof.

The case C is manually inserted into the holder 42 to a position in which the leading end of the rack 31 of the case C comes into meshing engagement with the loading pinion 50. In the meshing engagement between the rack 31 and the pinion 50, the stepped portion 32a of the synchronizing recess 32 of the case C abuts against the projection 151 of the pinion 50 and thereby rotates the pinion 50 by a predetermined angle and sets the pinion 50 in a predetermined position relative to the rack 31. The leading end portion of the rack 31 therefore meshes always smoothly with the pinion 50. When the rack 31 has meshed with the loading pinion 50, an unillustrated detection switch detects this state and causes the feed loading motor 47 to be switched on.

As the motor 47 has been switched on, the head base 44 is moved in the direction of arrow P3 through the driving force transmission means 51 and the carrier 41 thereby is moved in the same direction. The movement of the carrier 41 causes the pinion 50 to be rotated which in turn causes the case C whose rack 31 is in mesh with the pinion 50 to be moved in the direction of arrow P3. As the case C is moved in this manner and the disc a housed therein approaches the position above the turntable 46, the cams 49, 49, ... of the holder 42 gradually enter the unillustrated holes of the carrier 41 and the chassis 40 thereby lowering the holder 42. The lowering of the holder 42 causes the turntable 46 to enter relatively the inside of the case C through the turntable insertion opening 25 and support the disc a disposed in the case C. The disc a is now held between the disc stabilizer 24 disposed above and the turntable 46 disposed thereunder. Upon completion of holding of the disc a, the associated movement of the carrier 41 and the loading pinion 50 is terminated and the pinion 50 stops its rotation.

In the meanwhile, upon reaching of the head base 44 to a predetermined position in the direction of arrow P3, this state is detected by an unillustrated detection switch and the feed loading motor 47 thereby is rotated reversely to move the head base 44 to the direction of arrow P4. At this time, the associated movement of the carrier 41 and the head base 44 is terminated and the carrier 41 remains unmoved. When the pickup head 43 has reached the lead-in position by the movement of the head base 44 in the direction of arrow P4, this state is detected by an unillustrated detection switch and the movement of the head base 44 thereby is stopped.

Thus, the disc playback device is now in a state in which the disc a can be played back. Upon receiving of a play command, the disc drive motor 45 is rotated to turn the disc a with the turntable 46. In the meanwhile, the feed loading motor 47 supplies power for the feed operation feeding the head base 44 at a proper speed in the direction of arrow P3 in response to the play command. The pickup head 43 mounted on the head base 44 therefore picks up signals recorded on the disc a through the pickup head insertion slot 26 whereby playback of the disc a is performed.

For performing playback of the disc a in the disc playback device incorporating the loading system according to the invention, the case C can be loaded in the main body D only when the case C assumes a correct insertion position and otherwise cannot be loaded. The operation of the loading system in this respect will be described below.

Figure 15:
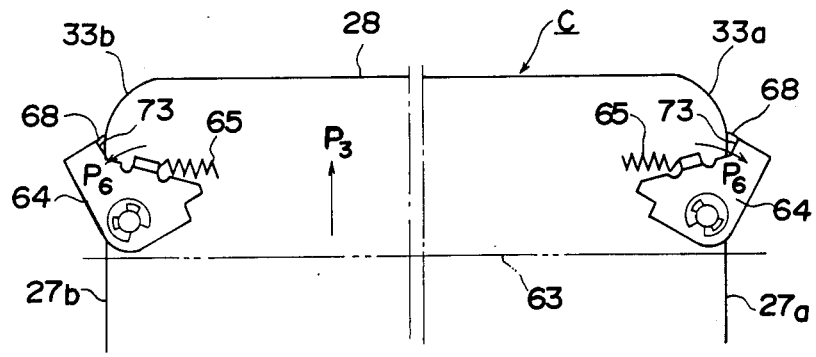

In a case where the case C is inserted into the disc cartridge case insertion opening 63 in a correct insertion posture as shown in FIG. 15, i.e., with its case lid 21 facing upwardly and its front end surface 28 constituting the end surface from which the case C is inserted into the holder 42, the curved surface portions 33a, 33b are brought into abutting engagement with the edge portions 73, 73 having the curved surfaces of the engaging portions 68, 68 of the case erroneous insertion blocking members 64, 64. The curved surface portions 33a, 33b guide the edge portions 73, 73 to rotate the blocking members 64, 64 in the direction of arrow P6 against the force of the springs 65, 65. Thus, the case C pushes the blocking members 64, 64 aside and moves towards the inside of the holder 42 (i.e., the direction of arrow P3). Accordingly, the case C can be loaded in the holder 42 without any trouble.

Figure 16:
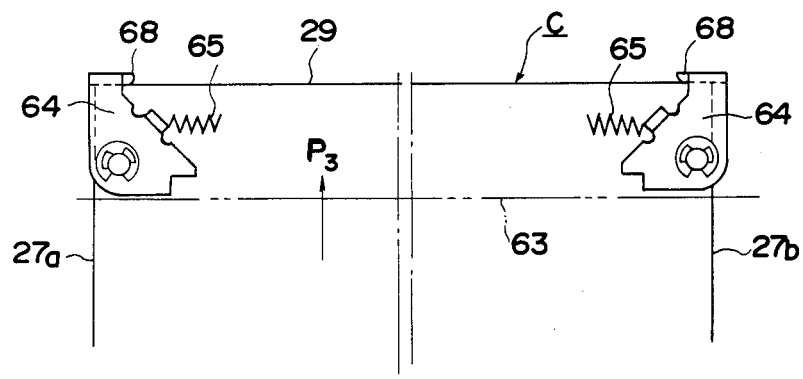

Assume now that the case C is erroneously inserted into the insertion opening 63 with the rear end surface 29 constituting the end surface from which the case C is inserted. Since, in this case, the rear end surface 29 is a flat surface crossing at right angles with the direction of insertion of the case C (i.e., the direction of arrow P3) and the engaging portions 68, 68 of the blocking members 64, 64 which cross at right angles with the direction of insertion are disposed in parallel to the rear end surface 29 as shown in FIG. 16, the end portions of both sides of the rear end surface 29 abut against the engaging portions 68, 68 and the case C cannot be inserted in the direction of arrow P3 any further. This result is the same whichever side of the case lid 21 and the bottom plate 22 may be facing upwardly, so long as the case C is inserted from the rear end surface 29 first.

Figure 17:
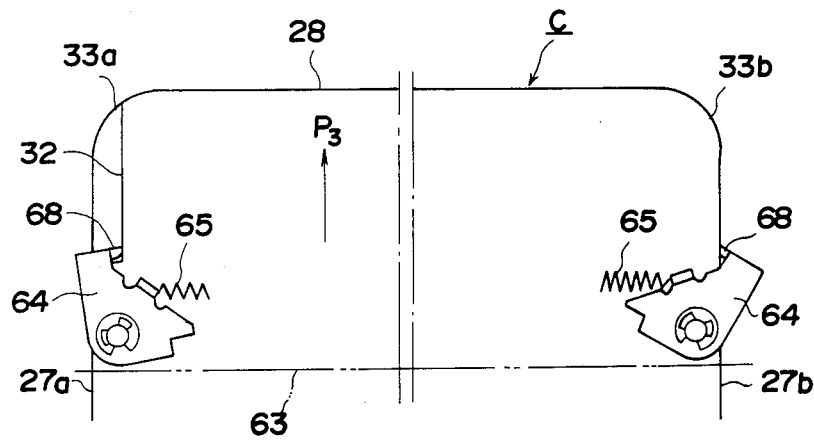

Assume further that the case C is inserted into the insertion opening 63 from the front end surface 28 first but with the bottom plate 22 facing upward. In this case, as shown in FIG. 17, the engaging portion 68 of one of the blocking members 64 abuts against the stepped portion 32a of the synchronizing recess 32 of the case C when the case C has been inserted by a predetermined distance into the holder 42 in the direction of arrow P3 so that the case C cannot be inserted any further.

In the above described manner, according to the loading system of the present invention, the case C cannot be inserted into the holder 42 unless the case C to be inserted is in a correct insertion posture. Besides, since the case erroneous insertion blocking members 64, 64 are provided on both sides of the disc cartridge case insertion opening 63, the operator of the device can recognize the erroneous insertion of the case C immediately by the blocking of the case C. The loading system, therefore, can prevent insertion of the case C into a deep inside position of the holder 42 in an incorrect insertion posture and thereby prevent damage which could occur to the main body D.

In the above described embodiment, the rear end surface 29 and the synchronizing recess 32 of the case C constitute the uncurved surface portions. Depending upon the position of the blocking member 64, however, a groove may be formed in a suitable place in the case C with its end along the direction of insertion being closed and this groove may be utilized as the uncurved surface portion.

Should the case C be inserted erroneously into the holder 42 clearing the erroneous insertion prevention means 56, a stop 90 provided on the inner surface of the guide wall 55 in the holder 42 functions to stop further erroneous insertion of the case C in the same manner as was previously described with reference to FIGS. 1 through 4.

In inserting the case C in the holder 42, the rack 31 of the case C can be meshed with the pinion 50 smoothly always under the same condition.

The operation of the loading system in this respect will be described with reference to FIGS. 13 and 14. When the main body D is in a standby state prior to playback of the disc a, the pinion 50 is in a position in which the synchronizing projection 151 crosses at right angles with the direction of insertion of the case C (the direction of arrow P3) and protrudes on the path of the inserted case C. If the pinion 50 is in its normal position, upon insertion of the case C in the direction of arrow P3, the stepped portion 32a of the synchronizing recess 32 formed in the case C engages with the synchronizing projection 151 of the pinion 50 in a predetermined position and this stepped portion 32a pushes the projection 151 in the direction of arrow P3 to rotate the pinion 50 in the direction of arrow P8. At this time, a leading tooth 160 of the rack 31 meshes between the wall portion 150 and the tooth 152 of the pinion 50. Then, a tooth 161 meshes between the tooth 152 and the tooth 153 and subsequent teeth of the rack 31 mesh with the subsequent teeth of the pinion 50. In this manner, the respective teeth of the rack 31 mesh smoothly with the respective teeth of the pinion 50.

Assume now that the main body D is subjected to vibration when the case C is inserted into the main body D with a result that the pinion 50 is rotated in the direction of arrow P8 or P9 and thereby is deviated from its normal position. If the case C is inserted in the main body D in this state, the stepped portion 32a of the synchronizing recess 32 engages with the synchronizing projection 151 in a position before or after the predetermined normal position and pushes this projection 151 in the direction of arrow P3 thereby rotating the pinion 50 in the direction of arrow P8. In this case also, by reason of the engagement of the stepped portion 32a and the projection 151, positional relations between the teeth 160, 161 . . . of the rack 31 and the wall portion 150, the teeth 152, 153 . . . of the pinion 50 are corrected to the same positional relations as in the case where the pinion 50 is in its normal position whereby the teeth of the rack 31 mesh smoothly with the teeth of the pinion 50 in the same manner as in the normal case.

Since the pinion 50 is so constructed that the portion 156 formed with the teeth 152 through 154 can flex in the direction of arrow P7 and the height of the tooth 152 substantially coincides with the pitch circle 149, if a slight discrepancy occurs in the positional relations between the teeth of the rack 31 and the teeth of the pinion 50 during the initial meshing therebetween due to vibration or like causes, the portion 156 flexes in the direction of arrow P7 and thereby enables the initial meshing to be achieved smoothly.

In the foregoing manner, according to the loading system of the invention, the rack 31 can mesh with the pinion 50 smoothly always in the same condition.

In the above described embodiment, the synchronizing recess 32 is formed in the case C and this synchronizing projection 151 of the pinion 50. Alternatively, a groove of a closed end may be formed in the case C and this groove may be caused to engage with the projection 151.

What is claimed is:

1. In a disc playback device comprising a main body including a chassis, a turntable provided above the chassis and a holder for holding a disc cartridge case having an insertion side and a side opposite the insertion side, wherein said holder is supported on the chassis in such a manner that it is displaceable with respect to the turntable between a disc playback position and a disc non-playback position, wherein a disc cartridge case which houses a disc is to be loaded in said holder and said holder is displaced from the disc non-playback position to the disc playback position for playing back of the disc, a loading system for a disc cartridge case comprising:

a curved surface portion formed in a corner portion on the insertion side of the disc cartridge case, from which the disc cartridge case is inserted into the holder;

an uncurved surface portion formed in a corner portion on said opposite side of the disc cartridge case; and a case erroneous insertion blocking member in the playback device being rotatable between a case inserting position in which the disc cartridge case can be inserted into the holder and a case blocking position in which the disc cartridge case cannot be inserted into the holder and including an engaging portion being engageable with either the curved surface portion or the uncurved surface portion of the disc cartridge case in such a manner that, when the disc cartridge case is in a correct insertion posture, the engaging portion cooperates with the curved surface portion to rotate the case erroneous insertion blocking member from the case blocking position to the case inserting position whereas, when the disc cartridge case is in an incorrect insertion posture, the engaging portion cooperates with the uncurved surface portion to retain the case erroneous insertion blocking member in the case blocking position.

2. A loading system for a disc cartridge case as defined in claim 1 wherein said holder has a disc cartridge case insertion opening and wherein said case erroneous insertion blocking member is provided laterally on each side in a portion in the vicinity of the case insertion opening.

3. A loading system for a disc cartridge case as defined in claim 1 wherein the disc cartridge case is formed with a groove extending in the direction in which the case is inserted in the holder and the holder is provided with a stop which permits the disc cartridge case to be inserted into a predetermined position in the holder when the stop is located in said groove of the inserted disc cartridge case and prevents the disc cartridge case from being inserted into the predetermined position when the stop abuts against a portion of the inserted disc cartridge case other than said groove.

4. A loading system for a disc cartridge case as defined in claim 1 further comprising:
   a rack provided on the disc cartridge case;
   a loading pinion provided on the main body for meshing with the rack to drive the disc cartridge case to a predetermined position in the holder;
   a recess or a groove formed in the disc cartridge case; and
   a synchronizing projection provided on the loading pinion being engageable in said recess or groove in the disc cartridge case before the loading pinion meshes with the rack so as to synchronize initial meshing between the loading pinion and the rack.

5. A loading system for a disc cartridge case as defined in claim 1 wherein said uncurved portion is an end surface of the disc cartridge case on the side opposite to the side from which the disc cartridge case is inserted into the holder.

6. A loading system for a disc cartridge case as defined in claim 1 wherein there is a further uncurved surface portion which is a recess formed in one side portion of the disc cartridge case or a groove formed in one side portion of the disc cartridge case and being closed in one end in the direction in which the groove extends.

7. A disc cartridge case adapted for use in a loading system in a disc playback device in which a movable case erroneous blocking member is utilized to prevent incorrect insertion of the cartridge case into a disc cartridge case holder of the playback device, the disc cartridge case having an insertion side and a side opposite the insertion side, a curved surface portion formed in a corner portion on the insertion side of the disc cartridge case from which the disc cartridge case is inserted into the holder and an uncurved surface portion formed in a corner portion on said opposite side of the disc cartridge case, wherein the curved surface portion engages the blocking member in a manner to move the blocking member to allow the disc cartridge case to be fully inserted into the holder if the disc cartridge case is in a correct insertion orientation and the disc cartridge case is prevented from being fully inserted into the holder by the case erroneous blocking member if the uncurved surface portion comes into engagement with the blocking member.

8. A disc cartridge case as defined in claim 7 wherein the corner portion on the side from which the disc cartridge case is inserted into the holder is formed in an L shape as viewed in plan.

9. A disc cartridge case adapted for use in a disc cartridge loading system in which a case erroneous blocking member is utilized to prevent incorrect insertion of a cartridge case into a holder of the playback device and a rack and pinion system is utilized to drive the cartridge case to a predetermined position in the holder, comprising:
   a case for holding a disc, the case having an insertion side and a side adjacent the insertion side;
   a rack provided on said adjacent side for meshing with a loading pinion provided on the holder for driving the disc cartridge case, the rack having a starting end spaced from the insertion side; and
   a recess or a groove formed in the adjacent side in a position between the starting end of the rack and the insertion side and engageable with a part of the loading pinion for synchronizing initial meshing between the rack and the loading pinion.

10. A disc cartridge case as defined in claim 9 wherein a groove is formed on another side of the disc cartridge case opposite to the side on which the rack is provided and extending in the direction in which the case is inserted in the holder, such that either (a) said groove cooperates with a stop provided on the holder for permitting the disc cartridge case to be inserted into a predetermined position in the holder when the stop is located in the groove or (b) a portion of the disc cartridge case without a groove cooperates with the stop for preventing the disc cartridge case from being inserted into the predetermined position when the stop abuts against the portion without a groove.

11. A disc cartridge case as defined in claim 10 wherein said portion of the disc cartridge case without a groove is an end surface on said another side of the disc cartridge case opposite to the side from which the disc cartridge case is inserted into the holder.

12. A disc cartridge case as defined in claim 10 wherein said portion of the disc cartridge case without a groove is said rack.

13. A disc cartridge case as defined in claim 10 wherein said portion of the disc cartridge case without a groove is a recess formed ahead of the rack.

14. A loading system in a disc playback device for a disc cartridge case having a generally box-like shape having a first side having at least one rounded corner and a second side opposite the first side and having unrounded corners comprising:
   a chassis,
   a turntable supported on the chassis,
   a holder for holding the disc cartridge case and for moving the case with respect to the turntable between a playback position and a non-playback position, the holder having an opening for receiving the disc catridge case;
   a case insertion blocking member rotatable between a case insertion position and a case blocking position, the case insertion position being the position of the blocking member which allows the disc cartridge case to be inserted into the holder and the case blocking position being the position in the holder which does not allow the case to be inserted into the holder, wherein the blocking member is rotated from the case blocking position to the insertion position when it engages a rounded corner of the disc case and the blocking member remains in the blocking position when it engages an unrounded corner of the case.

* * * * *